(12) United States Patent
Mahdjoubi Namin

(10) Patent No.: US 12,103,864 B2
(45) Date of Patent: Oct. 1, 2024

(54) WATER DISTRIBUTION SYSTEM WITH AUTOMATIC HOT WATER PASTEURIZATION PROCEDURE

(71) Applicant: ORBITAL SYSTEMS AB, Malmö (SE)

(72) Inventor: Amir Mehrdad Mahdjoubi Namin, Malmö (SE)

(73) Assignee: ORBITAL SYSTEMS AB, Malmo (SE)

( * ) Notice: Subject to any disclaimer, the term of this patent is extended or adjusted under 35 U.S.C. 154(b) by 514 days.

(21) Appl. No.: 17/420,986

(22) PCT Filed: Jan. 10, 2020

(86) PCT No.: PCT/SE2020/050016
§ 371 (c)(1),
(2) Date: Jul. 6, 2021

(87) PCT Pub. No.: WO2020/145875
PCT Pub. Date: Jul. 16, 2020

(65) Prior Publication Data
US 2022/0098056 A1 Mar. 31, 2022

(30) Foreign Application Priority Data
Jan. 11, 2019 (SE) .................... 1950026-3

(51) Int. Cl.
*C02F 1/00* (2023.01)
*C02F 1/02* (2023.01)
(Continued)

(52) U.S. Cl.
CPC ............... *C02F 1/008* (2013.01); *C02F 1/02* (2013.01); *E03C 1/0408* (2013.01); *E03C 1/044* (2013.01);
(Continued)

(58) Field of Classification Search
CPC ...... C02F 1/008; C02F 1/02; C02F 2103/002; C02F 2209/02; C02F 2209/40;
(Continued)

(56) References Cited

U.S. PATENT DOCUMENTS 9,074,355 B2 * 7/2015 Jallon ...................... E03C 1/00
2011/0042470 A1 * 2/2011 Deivasigamani .. G05D 23/1909
236/51
(Continued)

FOREIGN PATENT DOCUMENTS

AT 010563 U1 6/2009
DE 102014104393 A1 10/2014
(Continued)

OTHER PUBLICATIONS

European Search Report for Application No. EP20739019, dated Sep. 9, 2022, 6 pages.
(Continued)

*Primary Examiner* — Waqaas Ali
(74) *Attorney, Agent, or Firm* — MOSER TABOADA

(57) ABSTRACT

The present invention describes a water distribution system 1 comprising a water supply, a heating source 100, at least one temperature sensor, a flow path for water with a user outflow UO, and a control unit for operation of the water distribution system 1, said temperature sensor being connected to the control unit, wherein the control unit also is connected to at least one presence sensor PS arranged for the detection of presence of a human or animal body in physical proximity to the user outflow UO and/or in an outflow direction area from the user outflow UO and wherein the control unit is arranged to drive a hot water pasteurization procedure of at least a portion of the flow path and out from the user outflow UO based on a response or an indication of no presence of a human or animal body in physical prox- (Continued)

imity to the user outflow UO and/or in an outflow direction area from the user outflow UO.

7 Claims, 2 Drawing Sheets

(51) Int. Cl.
*E03C 1/04* (2006.01)
*E03C 1/044* (2006.01)
*E03C 1/05* (2006.01)
*C02F 103/00* (2006.01)

(52) U.S. Cl.
CPC .......... *E03C 1/05* (2013.01); *C02F 2103/002* (2013.01); *C02F 2209/02* (2013.01); *C02F 2209/40* (2013.01); *C02F 2209/44* (2013.01); *C02F 2301/046* (2013.01); *C02F 2303/04* (2013.01); *E03C 2201/40* (2013.01)

(58) Field of Classification Search
CPC .......... C02F 2209/44; C02F 2301/046; C02F 2303/04; C02F 1/32; C02F 2307/14; E03C 1/0408; E03C 1/044; E03C 1/05; E03C 2201/40; E03C 1/057; E03C 1/055; E03C 1/10; E03B 1/042; E03B 2001/045; E03B 1/04; F24D 17/0005; F24D 17/0073

See application file for complete search history.

(56) References Cited

U.S. PATENT DOCUMENTS

2014/0263689 A1 9/2014 Foust et al.
2016/0319522 A1 11/2016 Sparre et al.

FOREIGN PATENT DOCUMENTS

| | | |
|---|---|---|
| EP | 2650261 A1 | 10/2013 |
| KR | 20100081288 A | 7/2010 |
| NL | 1039131 C2 | 5/2013 |
| SE | 1750766 A1 | 12/2018 |
| WO | WO-2013095278 A1 | 6/2013 |
| WO | WO-2017201192 A1 | 11/2017 |
| WO | WO-2018/056815 A1 | 3/2018 |

OTHER PUBLICATIONS

International Search Report on application No. PCT/SE2020/050016 dated Mar. 26, 2020.

* cited by examiner

WATER DISTRIBUTION SYSTEM WITH AUTOMATIC HOT WATER PASTEURIZATION PROCEDURE

FIELD OF THE INVENTION

The present invention relates to a water distribution system having an automatic hot water pasteurization procedure.

TECHNICAL BACKGROUND

There are existing water distribution systems with hot water pasteurization procedures. For instance in SE 1750766-6 there is disclosed a method for hygenisation of a device intended for recycling of water, said device comprising a flow path for recycled water, a fresh water inlet, a recirculation water inlet and a recirculation water outlet, a user outlet, a heater and a filter, said method comprising performing the steps of heating water in the heater; and flowing heated water from the heater back to the filter for decontamination of the filter and other components in the flow path for recycled water.

The present invention is directed to providing a water distribution system, and method therefore, which is arranged to perform an automatic hot water pasteurization procedure with high reliability and efficiency.

SUMMARY OF THE INVENTION

The stated purpose above is achieved by a water distribution system comprising a water supply, a heating source, at least one temperature sensor, a flow path for water with a user outflow, and a control unit for operation of the water distribution system, said temperature sensor being connected to the control unit, wherein the control unit also is connected to at least one presence sensor arranged for the detection of presence of a human or animal body in physical proximity to the user outflow and/or in an outflow direction area from the user outflow and wherein the control unit is arranged to drive a hot water pasteurization procedure of at least a portion of the flow path and out from the user outflow based on a response or an indication of no presence of a human or animal body in physical proximity to the user outflow and/or in an outflow direction area from the user outflow.

In relation to the above it should be clear that the present invention is directed to a water distribution system comprising a presence sensor, where said presence sensor acts as a safe guard so that there is no risk for presence of a human or animal body once a hot water pasteurization procedure is performed in the water distribution system and where hot water then is flown out from a user outflow.

With reference to the expression "animal body", this may e.g. refer to pets. Furthermore, the expression "in physical proximity to the user outflow and/or in an outflow direction area from the user outflow" implies in any position where there is a risk to be exposed to hot water flowing out from the user outflow.

It should be noted that to use presence sensors in general have been described before, however not as according to the present invention and not for the purpose intended according to the present invention. One system which may comprise a presence sensor is disclosed in US 2011/0042470. US 2011/0042470 discloses a user activated hot water heater and control system for processing hot water to hot water output locations, e.g. faucet, shower, or the like. The temperature of the hot water delivered may be adjusted to a predetermined value determined by a user signature constructed from a potential user physical attributes such as height, weight, and the like. Detection of a unique individual user or general category user may be accomplished via the use of at least one physical attribute sensor. The physical attributes of the potential hot water user detected are primarily based on the user's height, weight, or combinations thereof.

The intention of the system according to US 2011/0042470 is to be implemented as a user activated tank-less hot water system so that water can be heated by a pre-activation sequence once a user is detected, and before e.g. a shower is started. As should be clear, the system according to US 2011/0042470 differs in several points when being compared with the system according to the present invention. First of all, the sensors provided in the system US 2011/0042470 is being used to detect certain parameters to drive a pre-heating sequence, and not as a safe guard and blocker for a hot water pasteurization procedure according to the present invention. Secondly, the systems as such are very different, where the water distribution system according to the present invention comprises several key elements, e.g. other sensors, which are not existing or implemented in a similar way in the system according to US 2011/0042470. Furthermore, and as mentioned, the core purposes of the present invention and the system according to US 2011/0042470 are also very different.

SPECIFIC EMBODIMENTS OF THE INVENTION

Below specific embodiments of the present invention are disclosed and discussed.

According to one embodiment of the present invention, said at least one presence senor is a motion sensor, an IR sensor, a radar sensor or a combination thereof, preferably a radar sensor or a radar sensor combined with another sensor. It should be mentioned that combinations of different sensors are also possible. In line with this, according to one specific embodiment of the present invention, said at least one presence sensor is combined with at least one other sensor. It should be noted that several presence sensors are also possible according to the present invention. As an example, any type of motion sensor may be combined with a IR sensor. As such, effective detection may be possible both in light and in the dark.

As should be understood from above, according to one specific embodiment of the present invention, said at least one presence sensor is a radar sensor. Moreover, a radar sensor combined with another sensor is also fully possible to incorporate according to the present invention.

The water distribution system according to the present invention may be any type where hot water may be used and where people or animals are intended to use the system and water, e.g. in houses, hotels or the like. Also recirculating systems are of great interest for the present invention. According to one specific embodiment, the water distribution system is a water recirculation system. According to yet another specific embodiment of the present invention, the water recirculation system is a recirculating shower.

The presence sensor or sensors may operate as a direct blocker of the system so that it cannot be operated. Furthermore, also a type of alarm function may be linked to the presence sensor. Most preferred is that the control unit is directly connected to the presence sensor. Therefore, according to one specific embodiment of the present invention, said at least one presence sensor is connected to the control unit.

The presence sensor may then simply function as a safe guard in the control unit. When the presence sensor does not indicate that there is a presence, then the control unit is free to perform a hot water pasteurization procedure in the water distribution system. When there is a presence, however, then the presence sensor sends a signal to the control unit and the control unit then knows that it cannot drive a hot water pasteurization procedure in the system.

Furthermore, also other units may be connected to the control unit according to the present invention. According to one specific embodiment of the present invention, a flow control unit is connected to the control unit. To implement a flow control mechanism in a system according to the present invention is possible and of interest as the temperature of the water in the system is measured and may be controlled. For the hot water pasteurization procedure these two parameters, that is temperature and flow, or volume linked to time, are the factors of importance when ensuring a disinfection of the flow path or at least part of the flow path. Therefore, according to the present invention it is possible to control both of these parameters in the control unit.

According to one embodiment of the present invention, the flow control unit is a flow meter located in the flow path. Such a flow meter may then measure the flow and send this information to the control unit. According to another embodiment of the present invention, a timer unit is connected to the control unit. The timer unit then functions to set a suitable time for exposure of the tube of the flow path to hot water during the hot water pasteurization procedure. As may be understood from above, if temperature, flow and also exposure time may be set in the control unit, then all important aspects of the hot water pasteurization procedure may be fully regulated by the control unit.

According to yet another embodiment of the present invention, the control unit is also connected to one or more other types of sensors. According to embodiment, the other types of sensors is at least one sensor which measures water quality. This sensor may then also be linked to the control unit. This connection may be based on measurement and then operations in the system.

According to one specific embodiment of the present invention, the water distribution system is a water recirculation system intended for recycling of water or discarding of water not suitable to recycle, said water recirculation system comprising a flow path for recirculation, at least one water treating unit, and a sensor unit arranged for measurement of at least water quality, and wherein the sensor unit is connected to the control unit which decides if water should be recycled or discarded in a point of separation based on the measurement of the water quality, said water recirculation system also comprising a heating source and a user outflow arranged at the end of the flow path for recirculation, and wherein the control unit is arranged to drive a hot water pasteurization procedure of at least a portion of the flow path and out from the user outflow based on a response or an indication of no presence of a human or animal body in physical proximity to the user outflow and/or in an outflow direction area from the user outflow.

According to the embodiment disclosed above, the control unit has several key task operations. One such key operation is to determine if water should be recirculated in the system of should be sent to another separation or sent to waste. Another one is to drive a hot water pasteurization procedure and to use a presence sensor as the safe guard to ensure that no person or animal is present when hot water is flown through and out from the user outlet. There are of course other possible operations for the control unit, such as to regulate water temperature, flow etc.

The present invention is also directed to a method. According to one embodiment of the present invention there is provided a method for performing a pasteurization procedure in a water distribution system according to the present invention, said method comprising
  controlling that no human or animal body is positioned in a risk zone by using said at least one presence sensor (PS) which is connected to the control unit driving the pasteurization procedure; and
  flowing hot water in at least part of the flow path for water and out from the user outflow (UO) when there is a response or an indication from the presence sensor (PS) that no human or animal body is positioned in said risk zone.

According to one embodiment, a flow control unit is connected to the control unit and wherein the method comprises controlling the flow of hot water during the pasteurization procedure.

According to yet another specific embodiment, a timer unit is connected to the control unit, and wherein the timer unit sets the intended time for flowing hot water based on the temperature measured in the temperature sensor.

As should be understood from above, the control unit is suitably connected to both a flow control unit and a timer unit. According to yet another embodiment of the present invention, the water distribution unit comprises a flow control unit being connected to the control unit and a timer unit being connected to the control unit, and wherein the method comprises controlling temperature, flow and residence time of the hot water during the pasteurization procedure.

The system and method according to the present invention provides a pasteurization solution which is both free from the need of additional chemicals and where no additional maintenance is needed. Moreover, the present invention may provide a system where the entire hot water pasteurization procedure may be regulated with reference to temperature, water flow and water amount being used and the exposure time. These features also enable that the flow rate being used may be reduced as long as the temperature and exposure time are high enough to ensure a strong hot water pasteurization.

BRIEF DESCRIPTION OF THE DRAWINGS

Embodiments of the present disclosure, briefly summarized above and discussed in greater detail below, can be understood by reference to the illustrative embodiments of the disclosure depicted in the appended drawings. However, the appended drawings illustrate only typical embodiments of the disclosure and are therefore not to be considered limiting of scope, for the disclosure may admit to other equally effective embodiments.

Figure 1:
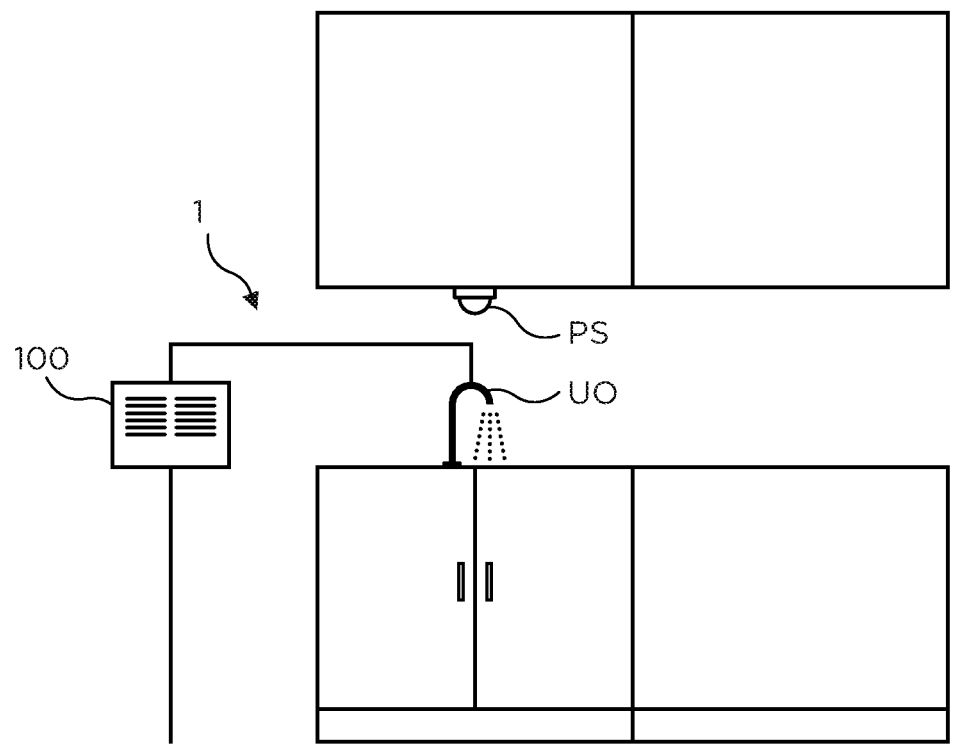
FIG. 1 depicts a water distribution system in accordance with some embodiments of the present disclosure.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION OF THE DRAWINGS

In FIG. 1 there is shown a water distribution system 1 according to one embodiment of the present invention. In this case, the water distribution system 1 may be connected to a water tap in a sink. The water distribution system 1 comprises a water supply, a heating source 100, at least one temperature sensor, a flow path for water with a user outflow UO, and a control unit for operation of the water distribution system 1, where the temperature sensor is connected to the control unit. Moreover, the control unit is also connected to at least one presence sensor PS arranged for the detection of presence of a human or animal body in physical proximity to the user outflow UO and/or in an outflow direction area from the user outflow UO. According to this embodiment, the presence sensor PS may e.g. be arranged above the water tap so that the sensor PS may detect any type of presence of hands or the like in the sink.

Furthermore, the control unit is arranged to drive a hot water pasteurization procedure of at least a portion of the flow path and out from the user outflow UO based on a response or an indication of no presence of a human or animal body in physical proximity to the user outflow UO and/or in an outflow direction area from the user outflow UO.

Figure 2:
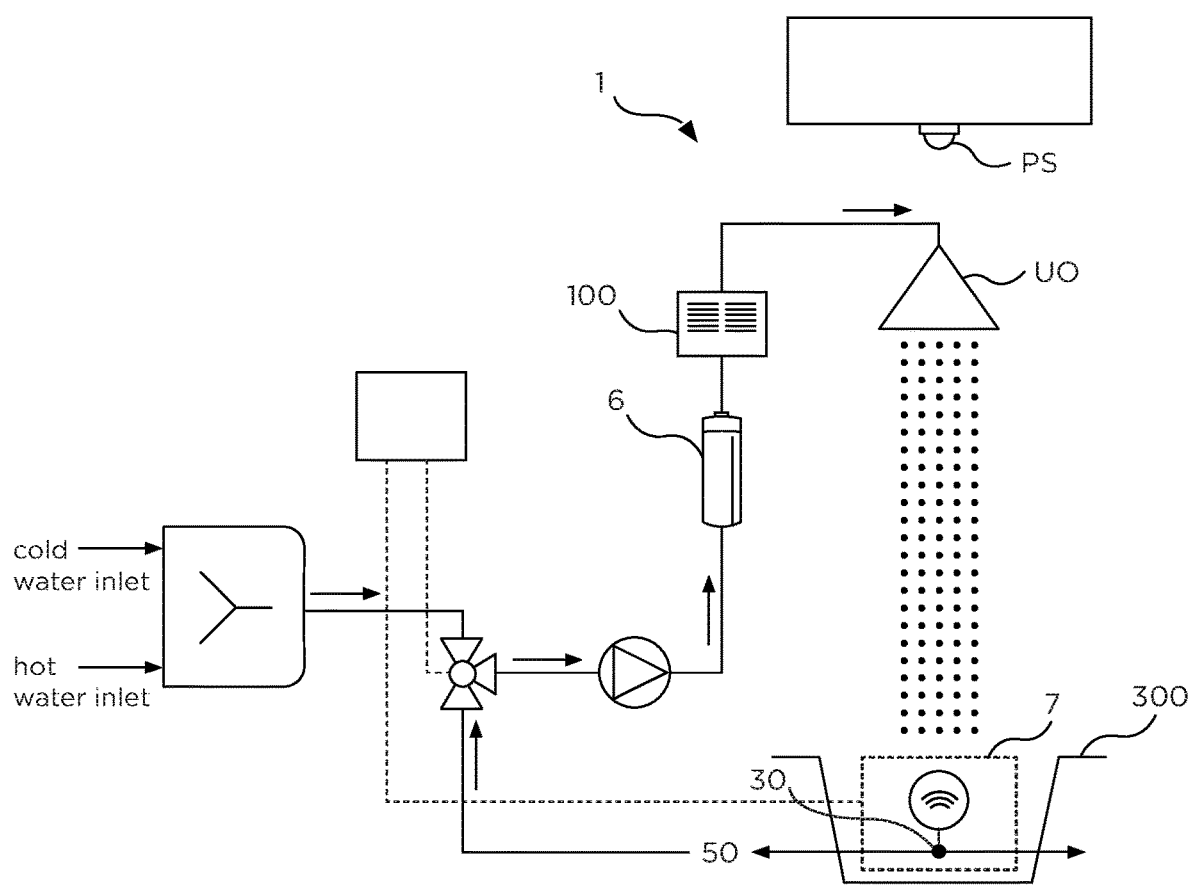
FIG. 2 depicts a water distribution system in accordance with some embodiments of the present disclosure.

In FIG. 2 there is shown another embodiment of the present invention. In this case the water distribution system 1 is a water recirculation system 1 in the form a recirculating shower. The water recirculation system 1 is intended for recycling of water or discarding of water not suitable to recycle. Furthermore, the water recirculation system 1 comprises a flow path for recirculation 50, at least one water treating unit 6, which may be e.g. a filter or a UV unit or something else, and a sensor unit 7 arranged for measurement of at least water quality. The sensor unit 7 is connected to the control unit (see dotted lines) which decides if water should be recycled or discarded in a point of separation 30 based on the measurement of the water quality. Moreover, the water recirculation system 1 also comprises a heating source 100 and a user outflow UO arranged at the end of the flow path for recirculation 50. The control unit is arranged to drive a hot water pasteurization procedure of at least a portion of the flow path and out from the user outflow UO based on a response or an indication of no presence of a human or animal body in physical proximity to the user outflow UO and/or in an outflow direction area from the user outflow UO.

It should be noted that the heating source 100 and the water treating unit 6 may be one and the same unit, i.e. only hot water is used to treat the water. Moreover, the water treating unit 6 may also be in a combined unit, such as a combined UV and heater unit. Furthermore, the water treating unit 6 may also be in a separate unit, such as shown in FIG. 2. In this case it is in the form a filter 6.

Also the heating source 100 may be complemented with several heating units, of same type or different. One possible solution is as a heat exchange arrangement. Moreover, also other types of external heating sources may be used, such as solar panels, LP gas etc. Suitably only hot water is used for heating, also in the case where solar panels or other heating sources are used. In such cases water is heated by the external source, and is then used in the water recirculation system 1.

It should also be noted that the sensor unit 7 may in fact comprise several sensors. Such sensors may be positioned at different places in the system. In the embodiment shown in the figures, one or several may be positioned in a drain 300 where the point of separation 30 may be located.

As seen in FIG. 1, fresh cold and hot water enters the system via a mixer arrangement.

In relation to the positioning of the presence sensor PS according to this embodiment, the sensor PS may e.g. be arranged in the bath room ceiling. It should, however, be noted that there may be several suitable positions, as long as it is possible to detect presence in a flow direction out from the user outlet or close proximity thereto. The positioning used is also dependent on the type of shower installation. As another example, the shower may be operated by a user panel and this user panel may also have an integrated presence sensor PS. It should also be noted that the presence sensor may in fact be a sensor which detects something which in turn is a probable indication of presence. As one possible example, the presence sensor PS or at least one sensor PS in a combined PS system may be a sensor positioned to detect if the shower door is opened/closed. Any type of opening or closing then is a detection of presence. This may function together with other sensor solutions. This also implies that for the detection of presence of a human or animal body in physical proximity to the user outflow (UO) and/or in an outflow direction area from the user outflow (UO) a presence sensor does not have to detect this directly but may detected this both indirectly and/or directly.

One other sensor solution possible according to the present invention may be to also combine the present invention with so called smart home solutions. As an example, if a smart home system knows that no one is at home, or that all possible users are positioned at a distance from unsafe places, then a hot water pasteurization procedure may be performed. Such a smart home solution may also be combined with one or more presence sensors PS as described above. To combine the different sensors like this may imply that a simpler presence sensor PS may be used according to the present invention.

Furthermore, and as mentioned above, the sensor PS may be only one unit or several, possibly also of different types. According to one embodiment, the system 1 comprises both a IR sensor and another type of motion sensor.

The invention claimed is:

1. A water distribution system comprising a water supply, a heating source, at least one temperature sensor, a flow path for water with a user outflow, and a control unit for operation of the water distribution system, said temperature sensor being connected to the control unit,
    wherein the control unit also is connected to at least one presence sensor arranged for the detection of presence of a human or animal body in physical proximity to the user outflow and/or in an outflow direction area from the user outflow and wherein the control unit is arranged to drive a hot water disinfection procedure of at least a portion of the flow path and out from the user outflow based on a response or an indication of no presence of a human or animal body in physical proximity to the user outflow and/or in an outflow direction area from the user outflow,
    wherein the at least one presence sensor is a radar sensor, and
    wherein the water distributing system is a recirculating shower.

2. The water distribution system according to claim 1, wherein said at least one presence sensor is combined with at least one other sensor.

3. The water distribution system according to claim 1, wherein the water distribution system is a water recirculation system.

4. The water distribution system according to claim 1, wherein a flow control unit is connected to the control unit.

5. The water distribution system according to claim 4, wherein the flow control unit is a flow meter located in the flow path.

6. The water distribution system according to claim 1, wherein a timer unit is connected to the control unit.

7. A water distribution system, wherein the water distribution system is a water recirculation system intended for recycling of water or discarding of water not suitable to recycle, said water recirculation system comprising a flow path for recirculation, at least one water treating unit, and a sensor unit arranged for measurement of at least water quality, and wherein the sensor unit is connected to a control unit which decides if water should be recycled or discarded in a point of separation based on the measurement of the water quality, said water recirculation system also comprising a heating source and a user outflow arranged at the end of the flow path for recirculation, and wherein the control unit is arranged to drive a hot water disinfection procedure of at least a portion of the flow path and out from the user outflow based on a response or an indication of no presence of a human or animal body in physical proximity to the user outflow and/or in an outflow direction area from the user outflow.

\* \* \* \* \*